(12) United States Patent
Omanovic et al.

(10) Patent No.: US 11,215,822 B2
(45) Date of Patent: Jan. 4, 2022

(54) DIGITAL ASPHERIC MICROMIRROR HUD

(71) Applicant: Panasonic Automotive Systems Company of America, Division of Panasonic Corporation of North America, Peachtree City, GA (US)

(72) Inventors: Edo Omanovic, Livonia, MI (US); Patrick O'Connell, Novi, MI (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 0 days.

(21) Appl. No.: 16/989,331

(22) Filed: Aug. 10, 2020

(65) Prior Publication Data

US 2021/0048670 A1 Feb. 18, 2021

Related U.S. Application Data

(60) Provisional application No. 62/886,398, filed on Aug. 14, 2019.

(51) Int. Cl.
*G02B 27/01* (2006.01)
*B60R 11/02* (2006.01)

(52) U.S. Cl.
CPC ...... *G02B 27/0101* (2013.01); *B60R 11/0229* (2013.01); *G02B 2027/014* (2013.01); *G02B 2027/0138* (2013.01); *G02B 2027/0181* (2013.01); *G02B 2027/0183* (2013.01)

(58) Field of Classification Search
CPC ........ B60R 11/0229; G02B 2027/0138; G02B 2027/014; G02B 2027/0181; G02B 2027/0183; G02B 27/0101
See application file for complete search history.

(56) References Cited

U.S. PATENT DOCUMENTS

| | | | |
|---|---|---|---|
| 2010/0066832 A1* | 3/2010 | Nagahara | G02B 7/1822 348/148 |
| 2010/0289632 A1* | 11/2010 | Seder | G02B 27/01 340/436 |
| 2012/0218228 A1* | 8/2012 | Payne | G06F 3/0423 345/175 |
| 2013/0010366 A1* | 1/2013 | Nakamura | B60K 35/00 359/633 |
| 2015/0130853 A1* | 5/2015 | Hada | H04N 9/3155 345/690 |

* cited by examiner

*Primary Examiner* — Ram A Mistry
(74) *Attorney, Agent, or Firm* — Laurence S. Roach, Esq.

(57) ABSTRACT

A head up display arrangement for a motor vehicle includes a picture generation unit producing a light field. A digital micromirror device is positioned to reflect the light field. The digital micromirror device includes an array of mirrors each having an individually adjustable orientation. An electronic processor is communicatively coupled to the digital micromirror device and individually adjusts the orientation of each mirror such that the light field reflected by the digital micromirror device is visible to the driver as a virtual image.

20 Claims, 3 Drawing Sheets

DIGITAL ASPHERIC MICROMIRROR HUD

CROSS-REFERENCED TO RELATED APPLICATIONS

This application claims benefit of U.S. Provisional Application No. 62/886,398, filed on Aug. 14, 2019, the disclosure of which is hereby incorporated by reference in its entirety for all purposes.

FIELD OF THE INVENTION

The disclosure relates to a head up display (HUD) system in a motor vehicle.

BACKGROUND OF THE INVENTION

A head up display emits light that reflects off of one or more mirrors and from the front windshield to be seen by the driver. The light appears to come from a virtual image in front of the driver and in front of the windshield. This type of head up display is currently commercially available.

Conventional head up displays create the virtual image by first using a display to create an image. Next, the light from the image is reflected from one or more mirrors. Next, the light from the mirrors is reflected from the windshield. The mirrors are designed and positioned relative to the display so that the light seen by the driver, which is reflected from the windshield, appears to come from a virtual image that is outside of the vehicle. The mirrors and display are typically contained in a package that occupies a volume beneath the top surface of the dashboard.

A HUD includes a picture generation unit (PGU) which produces an image. The light from the PGU usually reflects off of two mirrored surfaces, then off of the windshield and back to the driver's eyes. The second mirror, an aspheric mirror, is able to tilt up and down to adjust for shorter and taller drivers. This requires a stepper motor which can provide the force to move the mirror.

Today the biggest reason HUDs are not very common in vehicles is due to packaging constraints. Another problem is that HUDs can be noisy due to the use of a stepper motor.

SUMMARY

The present invention may provide a digital micromirror device (DMD) in an aspheric configuration, thereby eliminating the need for the stepper motor altogether. The large number of tiny mirrors in the digital micromirror device may be able to tilt on their own, which means the mirrors themselves would not need to move.

In one embodiment, the invention comprises a head up display arrangement for a motor vehicle, including a picture generation unit producing a light field. A digital micromirror device is positioned to reflect the light field. The digital micromirror device includes an array of mirrors each having an individually adjustable orientation. An electronic processor is communicatively coupled to the digital micromirror device and individually adjusts the orientation of each mirror such that the light field reflected by the digital micromirror device is visible to the driver as a virtual image.

In another embodiment, the invention comprises a head up display method including producing a light field. An array of mirrors each having a width of less than one millimeter is provided. The light field is reflected by use of the mirrors. A respective orientation of each of the mirrors is individually adjusted such that the light field is visible to a human driver of the motor vehicle.

In yet another embodiment, the invention comprises a head up display arrangement for a motor vehicle, including a picture generation unit producing a light field. An array of mirrors is positioned to reflect the light field. Each of the mirrors has an individually adjustable orientation and has a reflective surface area of less than one square millimeter. An electronic processor individually adjusts the orientation of each mirror such that the light field reflected by the array of mirrors is visible as a virtual image to a human driver of the motor vehicle.

An advantage of the present invention is that it may reduce the size of the HUD package by eliminating the need for the stepper motor, thereby greatly helping in fitting the HUD into vehicles. Moreover, since the mirror is stationary, the outer case can be brought in much closer to the mirror.

Another advantage of eliminating the need for the stepper motor is the elimination of the noise associated with the stepper motor.

Yet another advantage is that this invention does not compromise safety, as the mirror can still be parked so that no sunlight gets reflected back to the driver.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1:
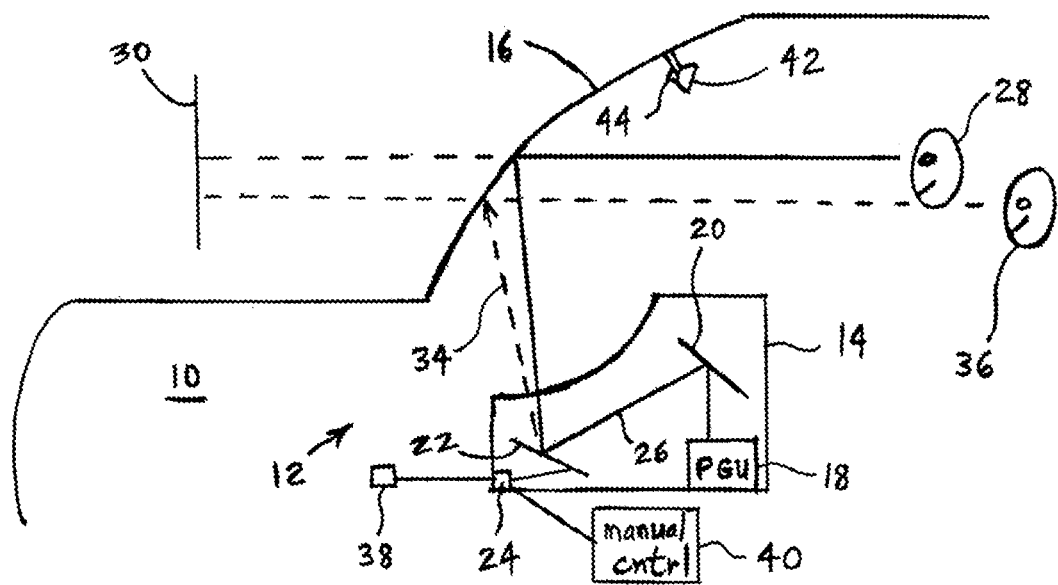
FIG. 1 is a schematic side view of one embodiment of a motor vehicle including a HUD arrangement of the present invention.

FIG. 1 illustrates one embodiment of a motor vehicle 10 including a head up display (HUD) arrangement 12 of the present invention, including a HUD unit 14 and a windshield 16. HUD unit 14 may include a PGU 18, a fold mirror 20, a digital micromirror device (DMD) 22 and an electronic processor 24.

During use, light field 26 from PGU 18, after being first reflected by mirror 20, may be reflected by device 22 and then by windshield 16 such that the reflection is visible to a driver 28 as a virtual image 30.

Figure 2:
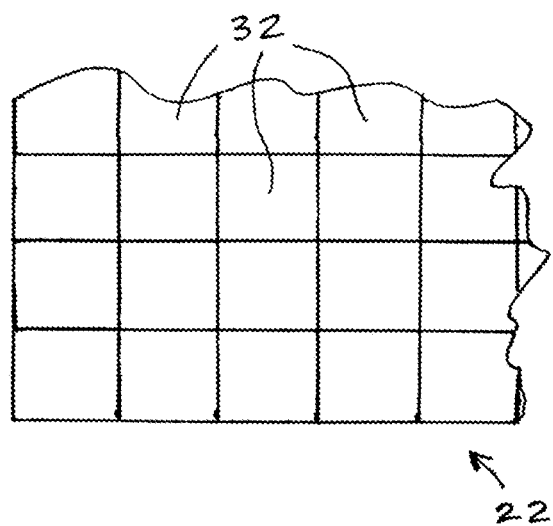
FIG. 2 is a fragmentary plan view of the digital micromirror device of the arrangement of FIG. 1.

FIG. 2 illustrates digital micromirror device 22 of arrangement 12 of FIG. 1. DMD 22 may include, for example, several hundred thousand microscopic mirrors 32 arranged in a rectangular array. In one embodiment, each of mirrors 32 may be made of aluminum and may measure about 16 micrometers across. Each of mirrors 32 can be individually rotated ±10-12 degrees relative to a plane defined by the overall device 22 (e.g., the plane of FIG. 2). If each mirror 32 is rotated in a same direction and by a same angle so as to reflect light in a same direction, then the angle of reflection provided by device 22 may be changed without changing the overall orientation of device 22. For example, if mirrors 32 of device 22 are all rotated such that light field 26 is reflected in direction 34, then virtual image 30 may be more easily viewed by a driver 36 who is of shorter stature.

During use, an in-vehicle camera 38 may capture images of the driver's face, and processor 24 may analyze the images to determine the vertical level or height of the eyes of the driver. Based on the vertical level of the eyes, processor 24 may determine that the light field is not reflecting off of an area of windshield 16 such that the eyes can easily see the reflected light field. Accordingly, processor 24 may adjust the orientations of microscopic mirrors 32 such that the light field reflects off of another area of windshield 16 from which the driver can better see the reflected light field and the virtual image.

Alternatively, the driver may manually adjust a control device 40 (e.g., a dial) to adjust the orientations of microscopic mirrors 32 until the light field reflects off of windshield 16 such that the driver can best see the reflected light field and the virtual image.

As another alternative, a rearview mirror 42 may have a manually adjustable orientation, as is conventionally known. A sensor 44 may detect the orientation of rearview mirror 42 after the driver has presumably adjusted the orientation so that he can see the scene through the rear window. Processor 24 may be in communication with sensor 44 and may use the detected orientation of rearview mirror 42 to estimate the positions of the driver's eyes, and thus determine the optimal orientations of mirrors 32 such that the driver can best see the virtual image.

Figure 3:
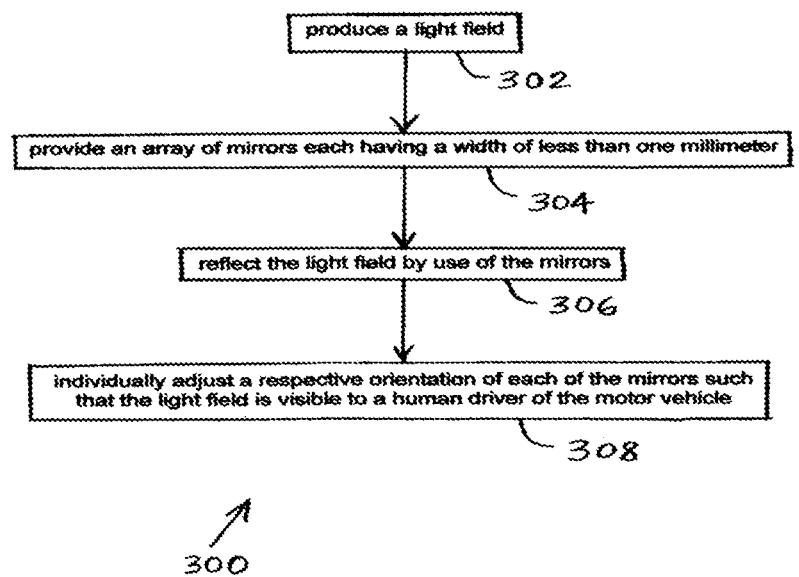
FIG. 3 is a flow chart of one embodiment of a head up display method of the present invention for a motor vehicle.

FIG. 3 illustrates one embodiment of a head up display method 300 of the present invention for a motor vehicle. In a first step 302, a light field is produced. For example, PGU 18 may produce a light field 26.

Next, in step 304, an array of mirrors is provided wherein each mirror has a width of less than one millimeter. For example, digital micromirror device 22 may include several hundred thousand microscopic mirrors 32 arranged in a rectangular array. Each of mirrors 32 may have a width of less than one millimeter.

In a next step 306, the light field is reflected by use of the mirrors. For example, light field 26 from PGU 18, after being first reflected by mirror 20, may be reflected by mirrors 32 of device 22.

In a final step 308, a respective orientation of each of the mirrors is individually adjusted such that the light field is visible to a human driver of the motor vehicle. For example, processor 24 may individually adjust the orientations of microscopic mirrors 32 such that the light field reflects off of another area of windshield 16 from which the driver can better see the reflected light field and the virtual image.

The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or ground, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A head up display arrangement for a motor vehicle, the arrangement comprising:
   a picture generation unit configured to produce a light field;
   a digital micromirror device positioned and configured to reflect the light field, the digital micromirror device including an array of mirrors each having an individually adjustable orientation; and
   an electronic processor communicatively coupled to the digital micromirror device and configured to individually adjust the orientation of each said mirror such that the light field reflected by the digital micromirror device is visible as a virtual image to a human driver of the motor vehicle, and such that the orientation of each said mirror is independent of content of the virtual image.

2. The head up display arrangement of claim 1 further comprising a fold mirror positioned and configured to reflect the light field from the picture generation unit to the digital micromirror device.

3. The head up display arrangement of claim 1 further comprising a windshield positioned and configured to reflect the light field from the digital micromirror device to the driver.

4. The head up display arrangement of claim 1 wherein the light field includes image data, the electronic processor is configured to individually adjust the orientation of each said mirror such that each said mirror is oriented at a substantially same angle, and each said mirror is kept at the substantially same angle as the image data changes.

5. The head up display arrangement of claim 1 further comprising a camera communicatively coupled to the electronic processor and configured to capture images of a face of the driver, the electronic processor being configured to individually adjust the orientation of each said mirror dependent upon the captured images.

6. The head up display arrangement of claim 1 further comprising a manually actuatable control communicatively coupled to the electronic processor, the electronic processor being configured to individually adjust the orientation of each said mirror dependent upon a position of the manually actuatable control.

7. The head up display arrangement of claim 1 further comprising:
   a rearview mirror having an adjustable orientation; and
   a sensor configured to detect the orientation of the rearview mirror, the sensor being communicatively coupled to the electronic processor, the electronic processor being configured to individually adjust the orientation of each said mirror dependent upon the detected orientation of the rearview mirror.

8. A head up display method for a motor vehicle, said method comprising:
   producing a light field including image data;
   providing an array of mirrors each having a width of less than one millimeter;
   reflecting the light field by use of the mirrors;
   individually adjusting a respective orientation of each of the mirrors such that the light field is visible to a human driver of the motor vehicle; and
   keeping the mirrors stationary as the image data changes.

9. The head up display method of claim 8 further comprising using a fold mirror to reflect the light field toward the array of mirrors.

10. The head up display method of claim 8 further comprising using a windshield to reflect the light field from the arrays of mirrors toward the driver.

11. The head up display method of claim 8 wherein the individually adjusting step includes individually adjusting the orientation of each said mirror such that each said mirror is oriented at a substantially same angle throughout changes in the image data.

12. The head up display method of claim 8 further comprising capturing images of a face of the driver, the individual adjusting of the orientation of each said mirror being dependent upon the captured images.

13. The head up display method of claim 8 further comprising ascertaining a position of a manually actuatable control, the individual adjusting of the orientation of each said mirror being dependent upon the ascertained position of the manually actuatable control.

14. The head up display method of claim 8 further comprising detecting the orientation of a rearview mirror, the individual adjusting of the orientation of each said mirror being dependent upon the detected orientation of the rearview mirror.

15. A head up display arrangement for a motor vehicle, the arrangement comprising:
- a picture generation unit configured to produce a light field;
- an array of mirrors positioned and configured to reflect the light field, each of the mirrors having an individually adjustable orientation and having a reflective surface area of less than one square millimeter; and
- an electronic processor communicatively coupled to the array of mirrors and configured to individually adjust the orientation of each said mirror such that the light field reflected by the array of mirrors is visible as a virtual image to a human driver of the motor vehicle, and such that the orientation of each said mirror stays constant as content of the virtual image changes.

16. The head up display arrangement of claim 15 further comprising a fold mirror positioned and configured to reflect the light field from the picture generation unit to the array of mirrors.

17. The head up display arrangement of claim 15 further comprising a windshield positioned and configured to reflect the light field from the array of mirrors to the driver.

18. The head up display arrangement of claim 15 wherein the electronic processor is configured to individually adjust the orientation of each said mirror such that each said mirror is oriented at a substantially same angle that is independent of the content of the virtual image.

19. The head up display arrangement of claim 15 further comprising a camera communicatively coupled to the electronic processor and configured to capture images of a face of the driver, the electronic processor being configured to individually adjust the orientation of each said mirror dependent upon the captured images.

20. The head up display arrangement of claim 15 further comprising a manually actuatable control communicatively coupled to the electronic processor, the electronic processor being configured to individually adjust the orientation of each said mirror dependent upon a position of the manually actuatable control.

\* \* \* \* \*